US012614742B2

(12) United States Patent
Teene et al.

(10) Patent No.: US 12,614,742 B2
(45) Date of Patent: Apr. 28, 2026

(54) PURGE SYSTEMS AND METHODS IN A FUEL CELL SYSTEM

(71) Applicants: CUMMINS INC., Columbus, IN (US); HYDROGENICS CORPORATION, Mississauga (CA)

(72) Inventors: Eero Teene, Hamilton (CA); Paolo Forte, Maple (CA); Sumit Tripathi, Columbus, IN (US); Richard J. Ancimer, Toronto (CA); Prabhsimran Malhi, Brampton (CA)

(73) Assignees: CUMMINS INC., Columbus, IN (US); HYDROGENICS CORPORATION, Mississauga (CA)

( * ) Notice: Subject to any disclaimer, the term of this patent is extended or adjusted under 35 U.S.C. 154(b) by 672 days.

(21) Appl. No.: 18/056,366

(22) Filed: Nov. 17, 2022

(65) Prior Publication Data

US 2023/0170502 A1     Jun. 1, 2023

Related U.S. Application Data

(60) Provisional application No. 63/284,455, filed on Nov. 30, 2021.

(51) Int. Cl.
| | |
|---|---|
| *H01M 8/04119* | (2016.01) |
| *H01M 8/04223* | (2016.01) |
| *H01M 8/04291* | (2016.01) |
| *H01M 8/0438* | (2016.01) |
| *H01M 8/04492* | (2016.01) |
| *H01M 8/04537* | (2016.01) |
| *H01M 8/04746* | (2016.01) |
| *H01M 8/04828* | (2016.01) |

(52) U.S. Cl.
CPC ... *H01M 8/04179* (2013.01); *H01M 8/04156* (2013.01); *H01M 8/04164* (2013.01); *H01M 8/04231* (2013.01); *H01M 8/04291* (2013.01); *H01M 8/04432* (2013.01); *H01M 8/04492* (2013.01); *H01M 8/04514* (2013.01); *H01M 8/04559* (2013.01); *H01M 8/04761* (2013.01); *H01M 8/04843* (2013.01)

(58) Field of Classification Search
None
See application file for complete search history.

(56) References Cited

U.S. PATENT DOCUMENTS

| | | | |
|---|---|---|---|
| 7,438,535 | B2 | 10/2008 | Morishima |
| 7,846,596 | B2 | 12/2010 | Wake et al. |
| 8,771,895 | B2 | 7/2014 | Sinha et al. |
| 9,105,888 | B2 | 8/2015 | Falta et al. |
| 9,660,280 | B2 | 5/2017 | Lee et al. |
| 10,703,213 | B2 | 7/2020 | Jeon et al. |
| 11,043,683 | B2 | 6/2021 | Lee et al. |

(Continued)

FOREIGN PATENT DOCUMENTS

| | | | |
|---|---|---|---|
| JP | 2004185974 | * | 7/2004 |
| JP | 2010135094 | | 6/2010 |

*Primary Examiner* — Jonathan Crepeau

(74) *Attorney, Agent, or Firm* — Barnes & Thornburg LLP

(57) ABSTRACT

The present disclosure generally relates to systems and methods for purging water or gas from a fuel cell system. The fuel cell system may include a multi-phase valve system and/or a separate valve system. The opening and closing of the valve systems for removing gas and water is controlled by a controller.

18 Claims, 9 Drawing Sheets

(56) References Cited

U.S. PATENT DOCUMENTS

| 2013/0089797 | A1 | 4/2013 | Falta et al. |
| 2014/0186725 | A1 | 7/2014 | Lee et al. |
| 2017/0179511 | A1* | 6/2017 | Jung ................. H01M 8/04686 |
| 2021/0194022 | A1 | 6/2021 | Kozuka |

* cited by examiner

PURGE SYSTEMS AND METHODS IN A FUEL CELL SYSTEM

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/284,455 filed on Nov. 30, 2021, the entire disclosure of which is hereby expressly incorporated herein by reference.

TECHNICAL FIELD

The present disclosure generally relates to systems and methods for purging water or gas from a fuel cell stack.

BACKGROUND

A fuel cell stack may generate electricity in the form of direct current (DC) from electrochemical reactions that take place in the fuel cell. The fuel cell stack generally comprises more than one fuel cell assemblies electrically connected in series, compressed, and bound to provide a simple compact power source. The stack may be supported by additional subsystems (e.g., a fuel handling subsystem, an air handling subsystem, and/or a coolant subsystem) to enable operation.

An anode or a fuel side of the fuel cell stack may operate as a closed system to prevent unintended loss of fuel and improve fuel consumption and efficiency. However, water in liquid and gaseous forms, and other gases (e.g., $N_2$) may accumulate at the anode inlet. To control or manage the accumulation of water and gases, periodic purging of the closed anode system is often required. The purged gases may be replaced with fresh fuel (e.g., fresh $H_2$) to maintain the concentration of fuel within the fuel cell stack.

Management of purging water and/or gases from the fuel cell stack may dominate a purge strategy and direct the implementation of a purging method. Described herein are systems and methods for designing, implementing, and/or controlling a purge strategy in a fuel cell or fuel cell stack. Also described herein are systems and methods of determining the implementation of a combined purge strategy or separate purge strategies for liquid and gaseous exhaust.

SUMMARY

Embodiments of the present invention are included to meet these and other needs.

In one aspect, described herein is a fuel cell system comprising a fuel cell stack comprising an endplate, an exhaust valve system configured to be connected to the endplate of the fuel cell stack for removing water and gas from an anode exhaust, and a controller configured to be connected to the exhaust valve system for regulating operation of the exhaust valve system. The exhaust valve system comprises a multi-phase valve system or a separate valve system. Operation of the exhaust valve system by the controller comprises opening the multi-phase valve system or the separate valve system to remove water before removing gas from the anode exhaust.

In some embodiments, the exhaust valve system may be the separate valve system comprising at least a first valve and a second valve. In some embodiments, the first valve may comprise a drain valve for removing water and the second valve comprises a gas valve for removing gas. The drain valve may comprise a water level sensor or a water separator device.

In some embodiments, the controller may control or may manage the exhaust valve system based on fuel cell stack operating conditions, time of operation, feedback loops, fuel cell stack pressure, one or more lookup maps, or one or more models. In some embodiments, the fuel cell system may further comprise an ejector and the controller may regulate the operation of the exhaust valve system based on any change in pressure is a recirculation loop through the ejector. In some embodiments, the fuel cell system may further comprise an ejector and the controller may compensate for purge based on size of a nozzle in the ejector. In some embodiments, the exhaust valve system may comprise a proportional valve. In some embodiments, the exhaust valve system may comprise the multi-phase valve system for removing water and gas at a first end of the fuel cell stack, and the separate valve system at a second end of the fuel cell stack. The separate valve system may include a first valve for removing water, and a second valve for removing gas. In some embodiments, a first end of the fuel cell system is a dry end, and a second end of the fuel cell system is a wet end or wherein the first end of the fuel cell system may be the wet end, and the second end of the fuel cell system may be the dry end.

In another aspect, described herein is a method of operating a fuel cell system. The method comprises removing water and gas from an anode exhaust using an exhaust valve system, monitoring performance of a fuel cell stack comprising an anode inlet, an anode outlet, a cathode inlet, and a cathode outlet, and controlling the exhaust valve system using a controller based on operating conditions of the fuel cell stack including one or more lookup maps.

In some embodiments, the one or more lookup maps comprise data or information based on water collected at the anode outlet at different current densities, cathode stoichiometry, maximum cell voltage differential measured using cell voltage monitoring, minimum cell voltage differential measured using cell voltage monitoring, differential pressure across the anode outlet and the anode inlet, or 3D purge mapping at different ambient conditions. In some embodiments, monitoring performance of the fuel cell stack may comprise the controller analyzing cell voltages across the fuel cell stack using a cell voltage monitoring circuit board. In some embodiments, the exhaust valve system may comprise a separate valve system including a first valve for removing water and a second valve for removing gas. Both the first valve and the second valve may be at a wet end or at a dry end of the fuel cell stack.

In some embodiments, controlling the exhaust valve system including the separate valve system may comprise: opening the first valve when a level switch detects water level above a threshold for a period of time, and opening the second valve coordinated with or opposite to the opening of the first valve. The period of time may be determined by the controller based on operating conditions comprising a first lookup map. The opening of the first valve or the second valve may be based on an open loop control strategy.

In some embodiments, the opening of the second valve may be determined by the controller based on a second model calibrated to estimate accumulation of crossover gas based on the operating conditions of the fuel cell stack. In some embodiments, the exhaust valve system may comprise a proportional valve.

In some embodiments, the separate valve system comprising the first valve for removing water and the second valve for removing gas may be at the wet end. Controlling the exhaust valve system may comprise the controller: opening the first valve for draining water when a level switch detects water level above a threshold for a first period of time, and keeping the first valve open for a second period of time after draining water for purging gas. The first period of time or the second period of time may be based on the operating conditions of the fuel cell stack including one or more lookup maps. In some embodiments, the exhaust valve system may comprise a proportional valve.

In some embodiments, the exhaust valve system may comprise a multi-phase valve system for removing water and for removing gas at a dry end and a separate valve system for removing water and for removing gas at a wet end. Controlling the exhaust valve system may comprise the controller: opening the multi-phase valve system when the fuel cell stack is tilted in an orientation that prevents water collection at the wet end by the separate valve system, keeping the multi-phase valve system open for a first period of time for purging water, and keeping the multi-phase valve open for a second period of time after purging water for purging gas. The first period of time or the second period of time may be based on the operating conditions of the fuel cell stack, the duration of the fuel cell stack operation, feedback loops in the fuel cell stack, the fuel cell stack pressure, the one or more lookup maps, or the one or more models. In some embodiments, the exhaust valve system may comprise a proportional valve.

These and other features, aspects, and advantages of the present invention will become better understood when the following detailed description is read with reference to the accompanying drawings described herein. Reference is also made to the accompanying drawings that form a part hereof and in which is shown by way of illustration specific embodiments in which the invention may be practiced. These embodiments are described in sufficient detail to enable those skilled in the art to practice what is claimed and it is to be understood that other embodiments may be utilized and that logical, mechanical, and electrical changes may be made without departing from the spirit and scope of the claims. The following detailed description is, therefore, not to be taken in a limiting sense.

DETAILED DESCRIPTION

The present disclosure is directed to systems and methods for designing, implementing, and/or controlling a purge strategy in a fuel cell stack or powertrain system. Described herein are systems and methods of determining the implementation of a combined purge strategy or separate purge strategies for liquid and gaseous exhaust.

Figure 1A:
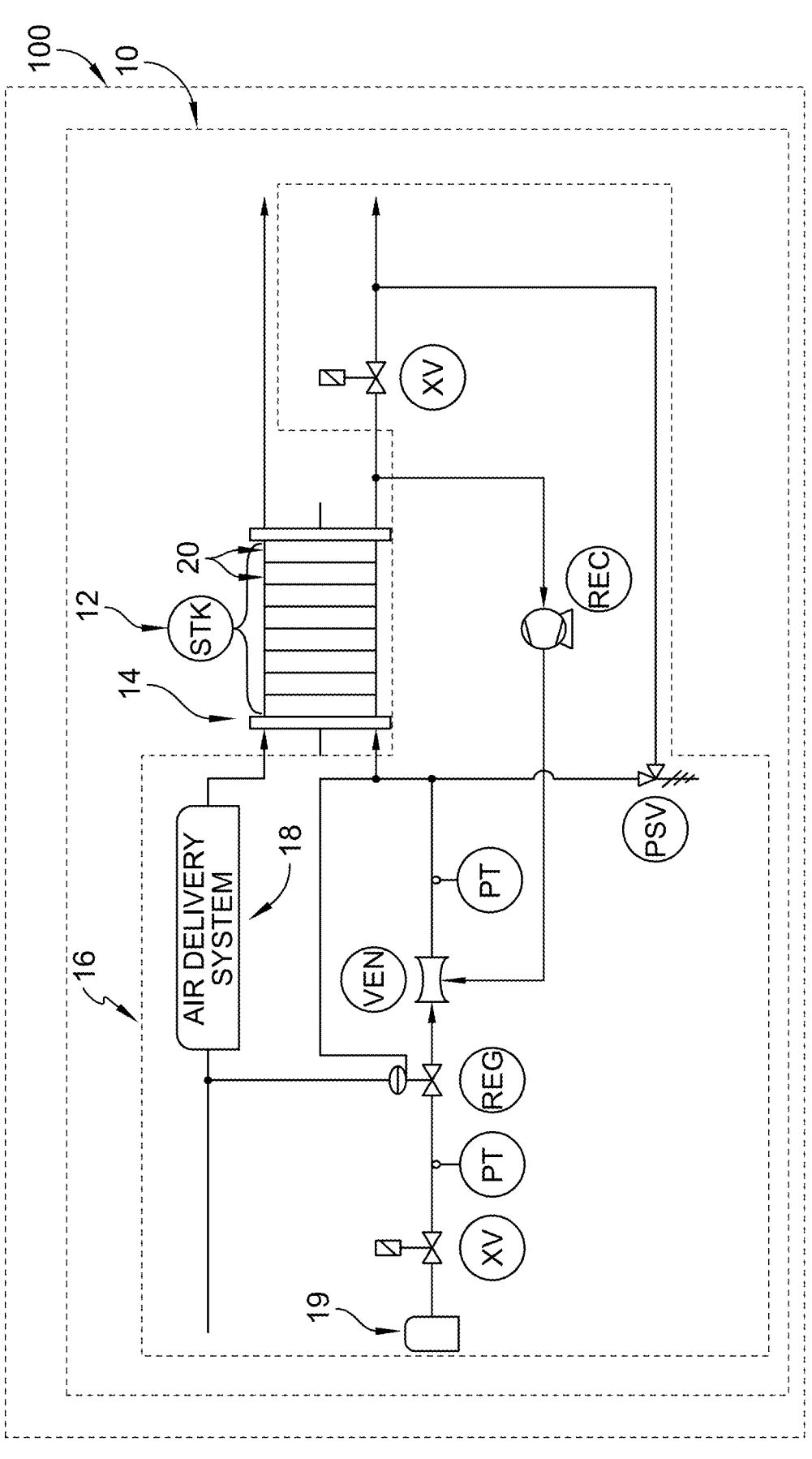
FIG. 1A is a schematic view of an exemplary fuel cell system including an air delivery system, an electrolyzer, and/or a fuel cell module including a stack of multiple fuel cells.
Figures 1B, 1C:
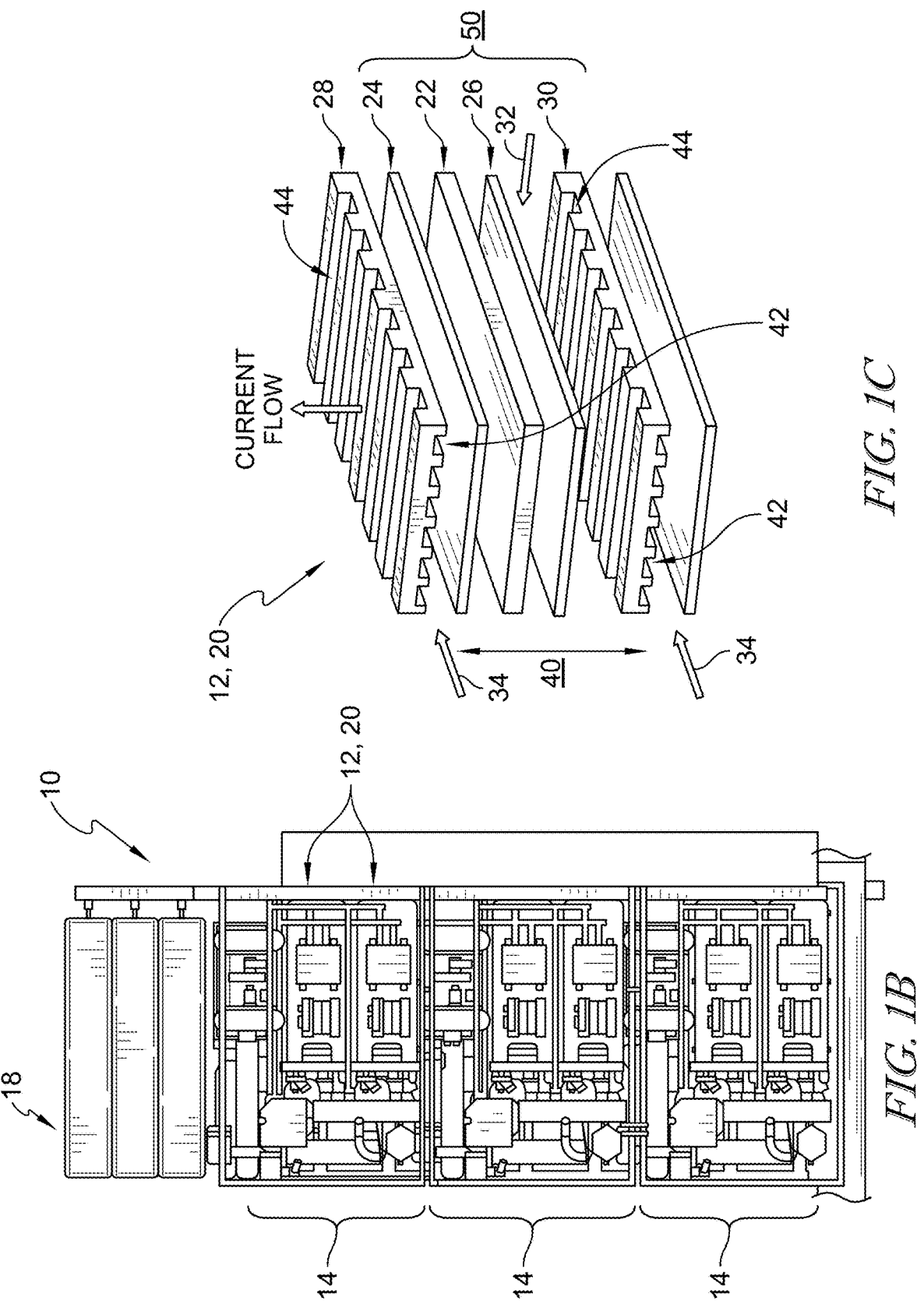
FIG. 1B is a cutaway view of an exemplary fuel cell system including an air delivery system, an electrolyzer, and/or a plurality of fuel cell modules each including multiple fuel cell stacks.
FIG. 1C is a perspective view of an exemplary repeating unit of a fuel cell stack of the fuel cell system of FIG. 1A.

As shown in FIG. 1A, fuel cell or powertrain systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells 20 to about 1000 fuel cells 20, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layer (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
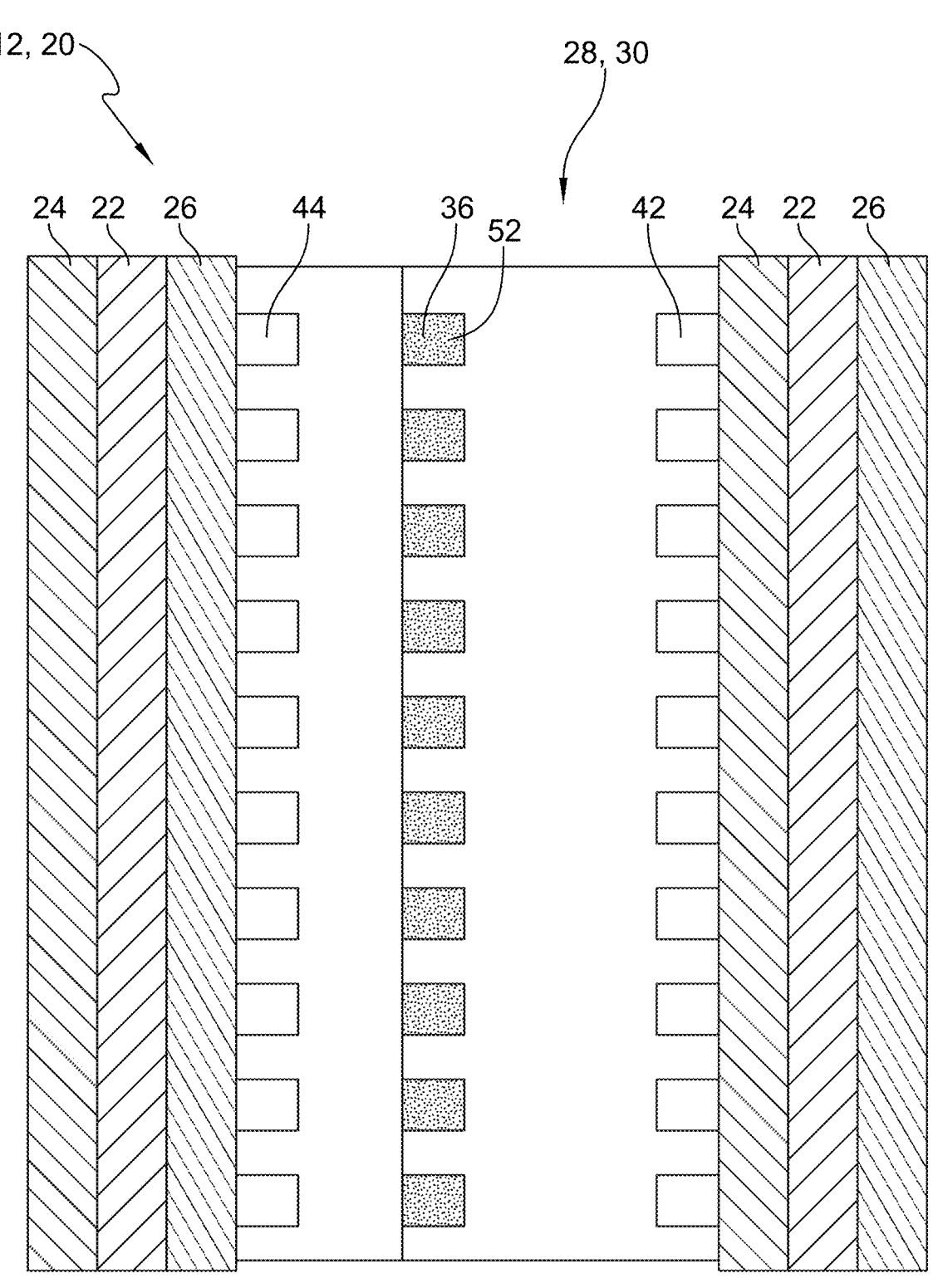
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24.

As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power systems, such as industrial applications and power generation plants. The fuel cell system 10 may also be implemented in conjunction with an air delivery system 18. Additionally, the fuel cell system 10 may also be implemented in conjunction with a source of hydrogen 19 such as a pressurized tank, including a gaseous pressurized tank, cryogenic liquid storage tank, chemical storage, physical storage, stationary storage, or electrolyzers. In one embodiment, the fuel cell system 10 is connected and/or attached in series or parallel to a source of hydrogen 19, such as one or more sources of hydrogen 19 in the BOP 16 (see FIG. 1A). In another embodiment, the fuel cell system 10 is not connected and/or attached in series or parallel to a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system 19 (e.g., an electrolyzer 19), an electrolyzer stack (not shown), and/or an electrolyzer cell (EC) (not shown), respectively. As such, in some embodiments, the features and aspects described and taught in the present disclosure regarding the fuel cell system 10, stack 12, or fuel cell 20 also relate to an electrolyzer 19, an electrolyzer stack, and/or an electrolyzer cell (EC). In further embodiments, the features and aspects described or taught in the present disclosure do not relate, and are therefore distinguishable from, those of an electrolyzer 19, an electrolyzer stack, and/or an electrolyzer cell (EC). The fuel cell stack 12 may operate as a closed system to prevent unintended loss of fuel 32 and improve fuel consumption and efficiency. For example, fuel stream may be exhausted from a fuel cell stack anode outlet 114 and recirculated back to the anode 104 through an anode inlet 112. A recirculation stream of the fuel 32 or anode exhaust back to the anode inlet 112 may include both fuel 32 and/or water 36.

The recirculation of the anode exhaust back to the anode inlet 112 may increase the anode inlet fuel flow rate such that the anode inlet flow rate is above the rate of fuel consumption in the fuel cell stack 12. Ensuring that the flow rate is above the fuel consumption rate may prevent fuel cell stack starvation, manage the humidity level of a fuel cell membrane, and improve fuel cell stack performance and life. Therefore, to control or manage the accumulation of water 36 and gases in the fuel cell stack anode 104 (inlet 112 or outlet 114), periodic purging of the closed anode system 104 is often required. The purged gases may be replaced with fresh fuel 32 (e.g., fresh H$_2$) to maintain the concentration of fuel 32 within the fuel cell stack 12.

A purged stream (e.g., anode exhaust or combustible exhaust) may be removed separately or combined with an air exhaust (e.g., cathode exhaust or non-combustible exhaust). Management of purging water 36 from the fuel cell stack 12 may dominate a purge strategy and direct the implementation of a purging method. The purging method, the frequency of purging, and the duration of purging are important variables of such purge strategy. The purge strategy may be designed to trade-off fuel cell stack 12 performance and life against net fuel utilization and life of a valve used for purging. The purge strategy may be configured, implemented, designed, or determined to ensure that the fuel content in the anode exhaust stream stays below any required threshold levels. Purging the fuel cell stack 12 or system 10 may therefore require several components for implementation.

Figure 2:
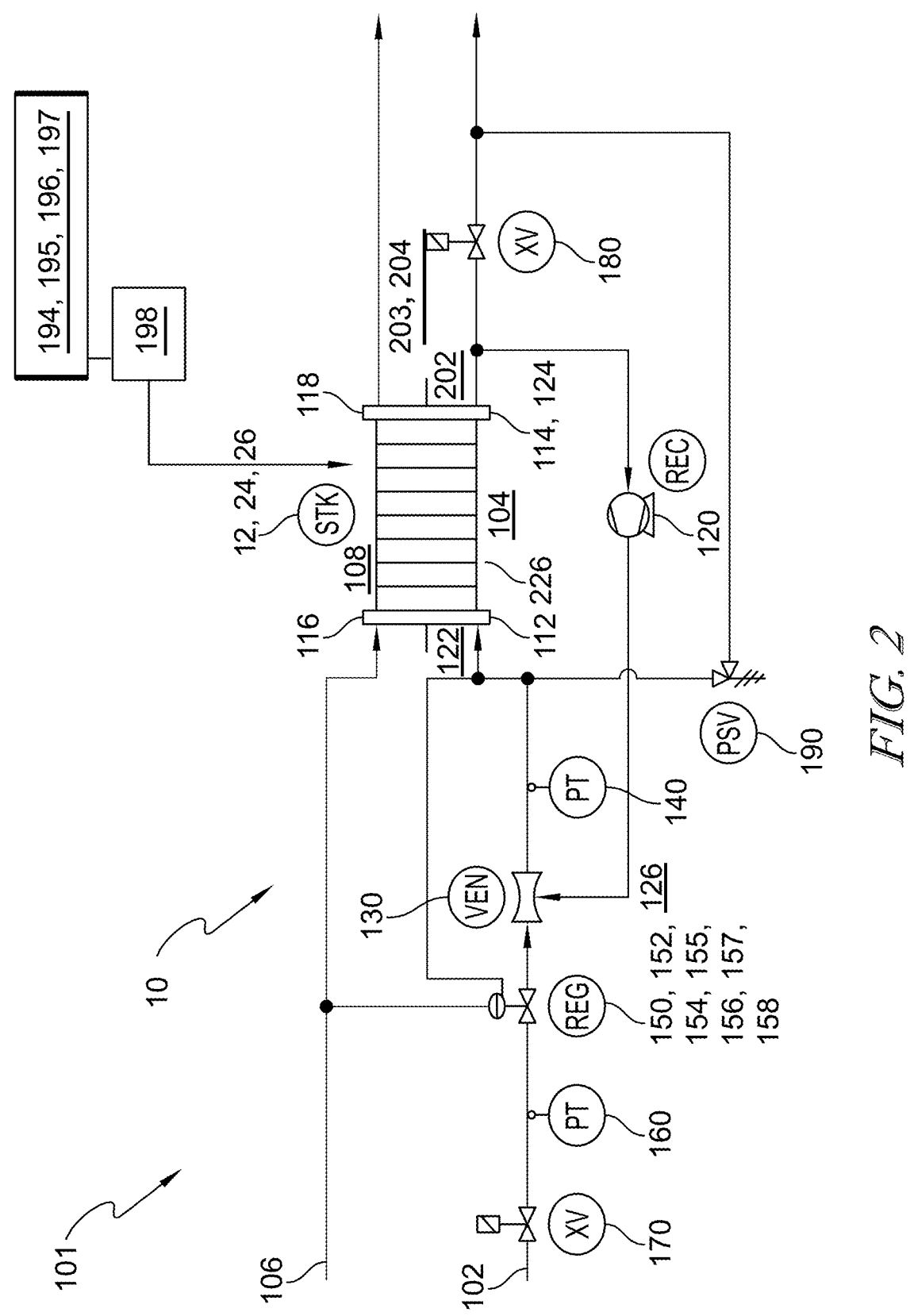
FIG. 2 is a schematic of one embodiment of an embodiment of a fuel cell stack or powertrain system comprising a fuel cell stack.

FIG. 2 illustrates an embodiment 101 of the fuel cell or powertrain system 10 comprising a fuel cell stack 12, a mechanical regulator 150, a recirculation pump or blower 120, the fuel cell stack 12, an exhaust valve 180, a shut off valve 170, a pressure safety valve 190, one or more pressure transducers 140/160, a venturi or ejector 130, and a controller 198. The controller 198 may control, regulate, or manage operation of different components of the fuel cell or powertrain system 101. In some embodiments, the present system 101 may include one or more fuel cell stacks 12 or one or more fuel cells 20. The system 101 may also include one or multiple valves, sensors, compressors, regulators, blowers, injectors, ejectors, and/or other devices in series or in parallel with each other.

An anode inlet stream 122, flows through the anode 104 end of the fuel cell stack 12 and exits as an anode gas outlet stream 202. Typically, the anode inlet stream 122 may be a mixture of fresh fuel (e.g., H$_2$) and anode exhaust (e.g., H$_2$ fuel and/or water). Conversely, oxidant 106 (e.g., air, oxygen, or humidified air) may flow through the cathode end 108 of the fuel cell stack 12.

The mechanical regulator 150 is a control valve 154 that may be used to control the flow of fresh fuel 102 also referred to as primary flow, primary mass flow, primary fuel, or motive flow to the anode 104. Pressure differential between the gas streams (e.g. anode inlet stream 122 and air 106) at the anode 104 and the cathode 108 may provide an input signal 156 to a controller 152 in the mechanical regulator 150.

The controller 152 of the mechanical regulator 150 may determine the flow of the anode inlet stream 122 through an anode inlet 112 at the anode 104. The control valve 154 may be a proportional control valve or an injector. In some embodiments, the control valve 156 may comprise an inner valve 158, a coil 155, or a solenoid 157 that controls the opening or closing of the control valve 154. The input signal 156 from the anode 104 and/or the cathode 108 of the fuel cell 20 or the fuel cell stack 12 may be a physical signal 156 or a virtual (e.g., an electronic) signal 156.

The input signal 156 may also be any type of a communicative or a computer signal 156 known in the art.

The fuel cell or powertrain system 101 may also comprise one or more exhaust valves 180. The fuel cell or powertrain system 101 may comprise one exhaust valve 180 if the system 101 is being used for stationary applications. In some embodiments, if the fuel cell or powertrain system 101 is being used in vehicle based applications, the fuel cell or powertrain system 101 may include at least two exhaust valves 180. An opening strategy of the two or more exhaust valves 180 may be determined by which exhaust valve 180 is physically posited lower due to vehicle tilt/orientation. One exhaust valve 180 may be located at the dry end of the fuel cell stack 12 and the other exhaust valve 180 may be located at the wet end of the fuel cell stack 12. The controller 198 may control the exhaust valve 180 based on operating conditions of the fuel cell stack 12, duration of fuel cell stack operation, feedback loops in the fuel cell stack 12, fuel cell stack pressure, one or more lookup maps 194, and/or one or more models.

The one or more exhaust valves 180 may remove both water (liquid) 36 and gas through the same valves. The one or more exhaust valves 180 may first remove liquid water 36 collected at a low point in the fuel cell stack 12 or in a collection device 226 in the fuel cell or powertrain system 101 and then removes any gas. If water 36 is continuously being generated, the water 36 may be removed as a two phase mixture comprising mostly gas. One or more exhaust valves 180 may be located at a low point in the fuel cell stack 12 or a collection device 226 in the fuel cell or powertrain system 101 to collect water. The fuel cell stack 12 may or may not have a water collection device 226 inside the anode channel 104.

Figures 3A, 3B, 3C:
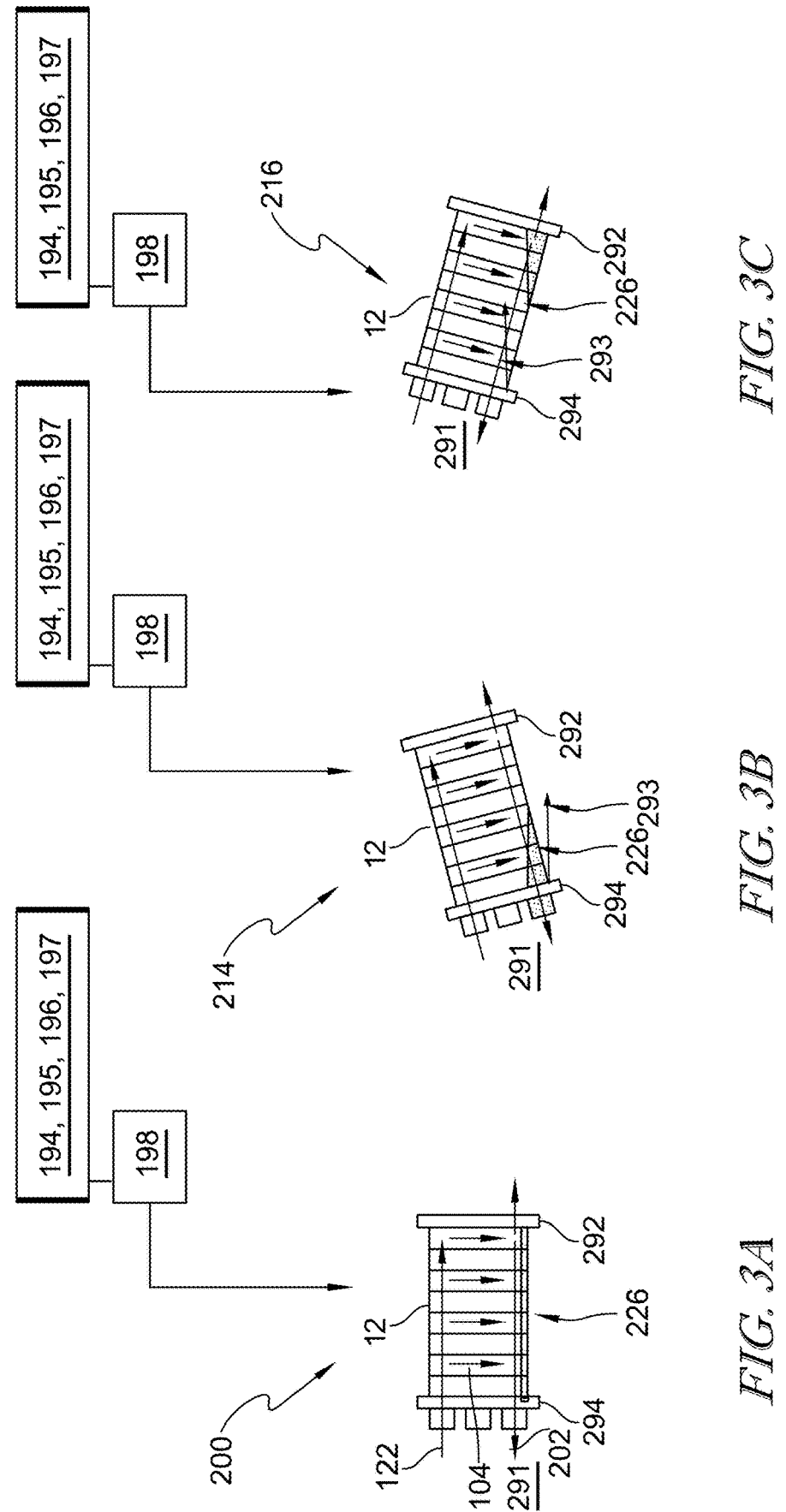
FIG. 3A is an illustration of a fuel cell stack with a dry end and a wet end in a horizontal position.
FIG. 3B is an illustration of a fuel cell stack with a dry end and a wet end tilted towards the wet end.
FIG. 3C is an illustration of a fuel cell stack with a dry end and a wet end tilted towards the dry end.

As shown in FIG. 3A-3C, the fuel cell stack 12 may include a dry end 292 and/or a wet end 294. The fuel cell stack end comprising or connected to a balance of plant (BOP) 291 may be the wet end 294, and the fuel cell stack end without the balance of plant (BOP) 291 may be the dry end 292. In other embodiments, the fuel cell stack end comprising or connected to a balance of plant (BOP) 291 may be the dry end 292, and the fuel cell stack end without the balance of plant (BOP) 291 may be the wet end 294. Fuel 32 enters the fuel cell stack 12 as the anode inlet stream 122 and exits as the anode gas outlet stream 202 through the wet end 294.

The fuel stack 12 may comprise a water collection device 226. The water collection device 226 may be a specific device or component or just a low point in the fuel cell stack 12 where water 36 will be collected mechanically or naturally by gravity. The fuel cell stack 12 may be straight, level, and/or horizontally positioned 200 where both the wet end 294 and the dry end 292 are located in a plane (e.g., a single plane or one plane) and the water collection device 226 is level across the stack 12, as shown in FIG. 3A.

Alternatively, the positioning of the fuel cell stack 12 may be tilted 214, 216. For example, as shown in FIG. 3B, the fuel cell stack 12 is tilted 214 with the dry end 292 raised above the plane comprising the wet end 294. Conversely, as shown in FIG. 3C, the fuel cell stack 12 may be tilted 216 with the wet end 294 raised above the plane comprising the dry end 292. The water accumulated in the water collection device 226 will accumulate in the lower point. Therefore, water 36 may flow or move to either the wet end 294 in the tilted fuel cell stack 214 or the dry end 292 in the tilted fuel cell stack 216 depending on the direction of the tilt.

Figures 4A, 4B, 4C:
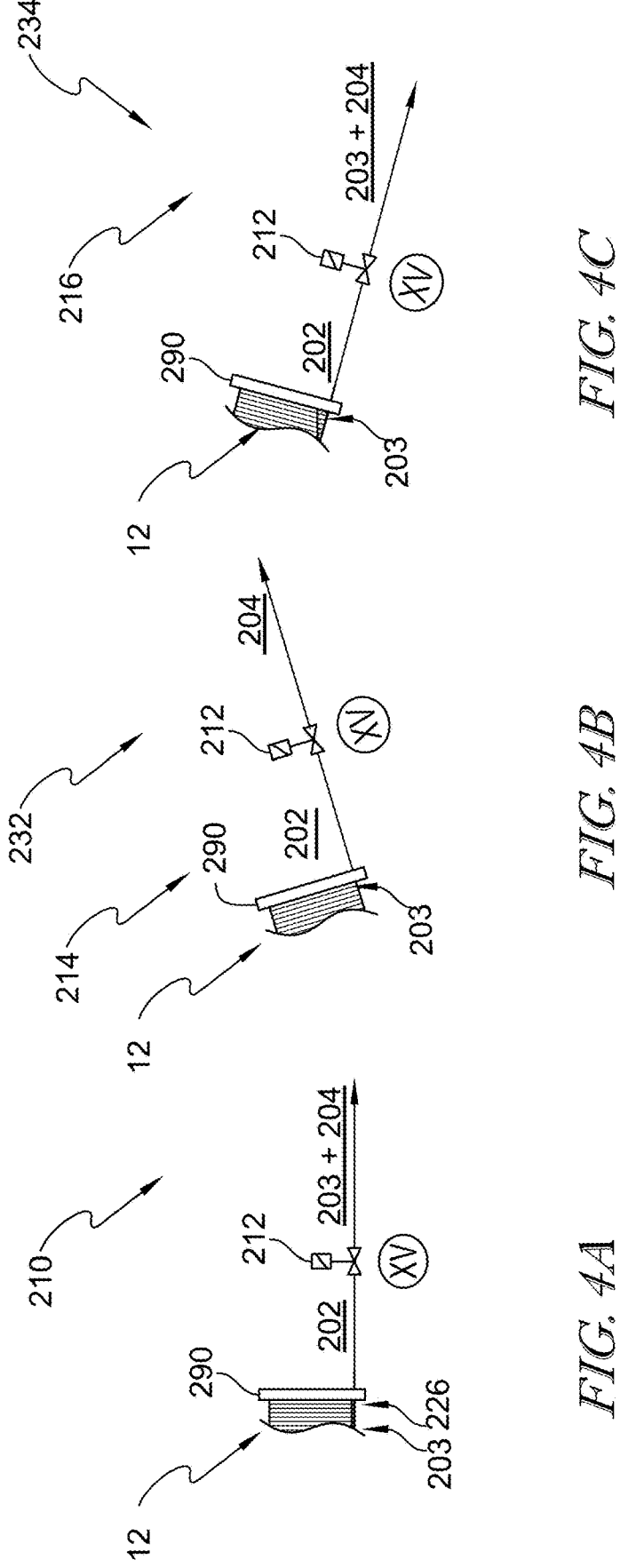
FIG. 4A is an illustration of a fuel cell stack comprising a multi-phase valve system in a horizontal position.
FIG. 4B is an illustration of a fuel cell stack comprising a multi-phase valve system tilted so that liquid water is not collected in the multi-phase valve system.
FIG. 4C is an illustration of a fuel cell stack comprising a multi-phase valve system tilted so that liquid water is collected in the multi-phase valve system.

As shown in FIG. 4A, a multi-phase valve system 210 may include only one exhaust valve 212. The multi-phase valve system embodiment 210 is utilized because the single exhaust valve 212 can be used to remove both liquid and gas phase exhaust. An anode gas outlet stream 202 from the stack 12, including both liquid water 203 and a gas mix 204 (e.g., a mix of H$_2$, N$_2$, and/or water vapor including any single gas or any combination thereof), may pass through the exhaust valve 212. For example, the multi-phase valve system 210 may remove gas 204 and/or water 203 from the anode gas outlet stream 202. As such, the multi-phase valve system 210 may be situated at a stack end plate 290. The stack end plate 290 may be located on or at the wet end 294 and/or the dry end 292 of the fuel cell stack 12.

As shown in FIG. 4B, a multi-phase valve system embodiment 232 may not be used to drain the liquid water 203 when the fuel cell stack 12 is in certain orientations, such as tilted 214 so that liquid water 203 is not collected in the multi-phase valve system 232. In such case, the exhaust valve 212 may only purge the gas mix 204 from the anode gas outlet stream 202, and cannot drain the liquid water 203 since any water collected by the water collection device 226 is tilted away from and therefore not fed into the multi-phase valve system 232.

In contrast, as shown in FIG. 4C, a multi-phase valve system embodiment 234 may be used to drain both liquid water 203 and the gas mix 204 when the fuel cell stack 12 is in certain orientations. For example, when the fuel cell stack 12 is tilted 214 so that liquid water 203 is collected in the water collection device 226 or basin 227 and fed into the multi-phase valve system 234, both liquid and water will be purged by the system 234. Specifically, the exhaust valve 212 may purge the gas mix 204 and liquid water 203 from the anode gas outlet stream 202.

Figures 5A, 5B, 5C:
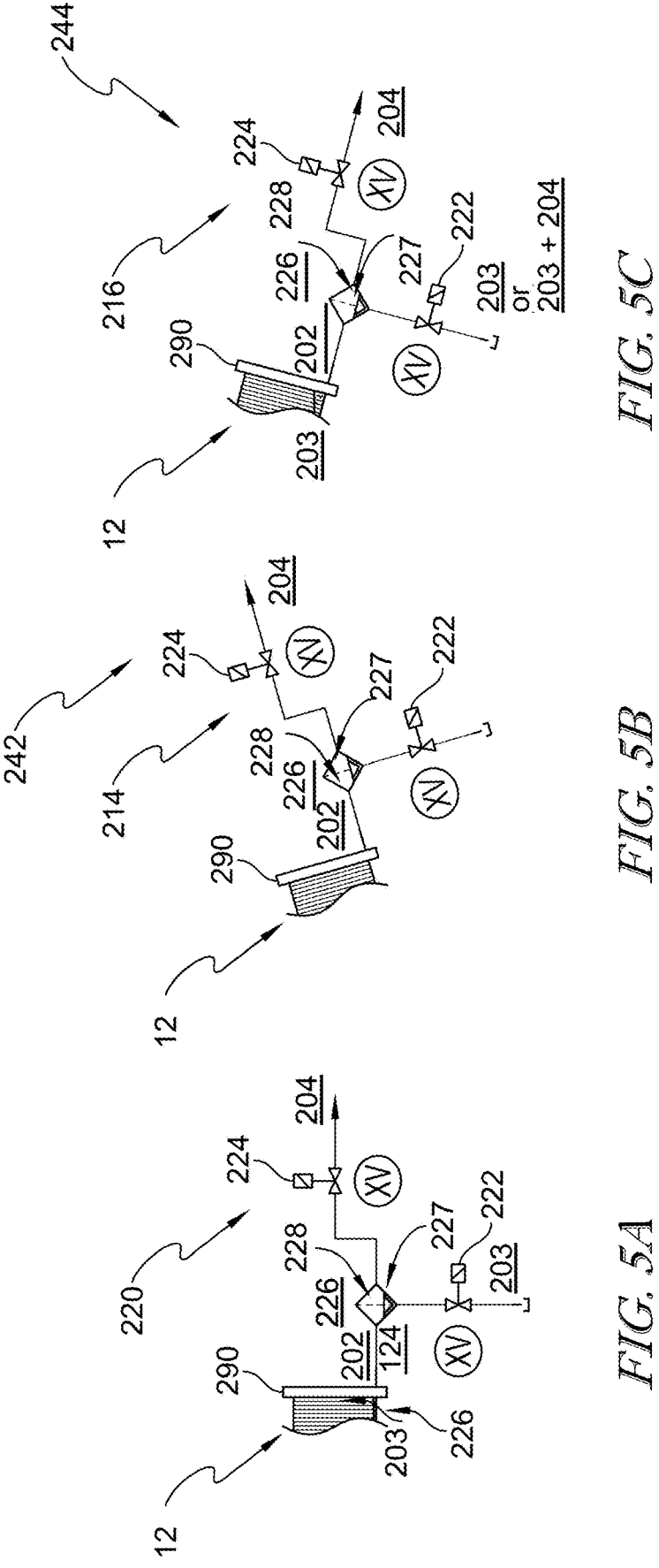
FIG. 5A is an illustration of a fuel cell stack comprising a separate valve system in a horizontal position.
FIG. 5B is an illustration of a fuel cell stack comprising a separate valve system tilted so that liquid water is not collected in the separate valve system.
FIG. 5C is an illustration of a fuel cell stack comprising a separate valve system tilted so that liquid water is collected in the separate valve system.

As shown in FIG. 5A, the fuel cell or powertrain system 101 may include a separate valve system 220 comprising at least two valves at a stack end plate 290. The stack end plate 290 may be located at or on the wet end 294 or the dry end 292 of the fuel cell stack 12. The separate valve system 220 includes separate exhaust valves for draining water 203 (e.g., a water drain valve 222) and/or for purging gases 204 (e.g., a gas purge valve 224) from the fuel cell stack 12.

One embodiment of the separate valve system 220 includes both the water drain valve 222 and the gas purge valve 224. The gas purge valve 224 and the water drain valve 222 can be used when the separate valve system 220 is positioned in a horizontal position as shown in FIG. 5A. The gas purge valve 224 may be used to remove gas 204 from the anode gas outlet stream 202. The water drain valve 222 may be able to remove water 203 and/or gas 204 from the fuel cell stack 12. The fuel cell or powertrain system 101 may include a separate valve system 220 comprising the water drain valve 222 and the gas purge valve 224. Including the separate valve system 220 allows the system 101 to utilize or operate the water drain valve 222, the gas purge valve 224, or both the water drain valve 222 and the gas purge valve 224 depending on the composition of the exhaust.

The separate valve system embodiment 220 may also include a water collection region or device 226 associated with the water drain valve 222. This water collection device 226 may be a separate basin or water separator device 227 or may be the water collection device 226 associated with or in the fuel cell stack 12. The basin or water separator device 227 may be located at the anode gas outlet stream 202. The basin or water separator device 227 may be designed or configured to accumulate liquid water 203 condensing out of the anode gas outlet stream 202. A level sensor 228 may be used to detect the level of water or liquid 203 and/or to calculate or determine when the accumulated water 203 in the basin or water separator device 227 rises to and/or above a threshold level. The threshold level of water 203 in the basin or water separator device 227 may indicate any level or amount of liquid or water 203 associated with damage, degradation, and/or malfunction of the fuel cell stack 12, such that a purge of water 203 is required and/or signaled (e.g., to a controller and/or other component). Alternatively, or additionally, the threshold level may indicate a maximum usage of the fuel cell stack 12 after which purging of liquid water 203 accumulated due to operation is required.

An anode gas purge pressure sensor 124 may be located within the anode gas outlet stream 202 upstream or downstream of the basin or water separator device 227. The anode gas purge pressure sensor 124 may be used to monitor the anode gas outlet pressure. For example, the anode gas purge pressure sensor 124 may detect or monitor the anode gas outlet pressure during the purging or draining process and signal if changes are necessary.

As shown in FIG. 5B, a separate valve system embodiment 242 may not be used to drain the liquid water 203 when the fuel cell stack 12 is positioned in certain orientations, such as tilted 214, 216. For example, the separate valve system 242 in the tilted position 214 may not be used to drain the liquid water 203 when liquid water 203 is not collected in the water collection device 226 or in the basin or water separator device 227. However, the gas purge valve 224 may still purge the gas mix 204 from the anode gas outlet stream 202, although the water drain valve 222 may not drain the liquid water 203 since the liquid water 203 may not collect in the water collection device 226 or in the basin or water separator device 227 due to its orientation in the fuel cell stack 12.

As shown in FIG. 5C, a separate valve system embodiment 244 may be used to drain both liquid water 203 and the gas mix 204 when the fuel cell stack 12 is positioned in certain orientations, such as tilted 216. Specifically, when liquid water 203 is collected in the water collection device 226 or in the basin or water separator device 227, that liquid water 203 flows from the stack 12 into the water drain valve 222. The gas purge valve 224 may purge the gas mix 204 from the anode gas outlet stream 202. The water drain valve 222 will drain the liquid water 203 and/or purge the gas mix 204.

As shown in FIG. 3B, tilted position 214 may be used to describe any position at which the dry end 292 of the fuel stack is tilted by an angle of about 1° (degree) to about 90° (degree) above the horizontal axis or plane 293, including any specific or range of degrees comprised therein. For example, the tilted angle 214 may range from about 1° to about 20°, from about 20° to about 45°, or from about 45° to about 90° above the horizontal axis or plane 293, including any degree or range of degrees comprised therein. Referring to FIGS. 4B and 5B, if the fuel cell stack 12 is the tilted in position 214, the separate valve system 242 or the multi-phase valve system 232 may not be able to drain liquid water 203. Tilted position 214 may include any position in which the separate valve system 242 or the multi-phase valve system 232 is located at a higher elevation than the fuel cell stack 12.

As shown in FIG. 3C, tilted position 216 may be used to describe any position at which the dry end 292 of the fuel stack 12 is tilted by an angle of about 1° (degree) to about 90° (degree) above the horizontal axis or plane 293, including any specific or range of degrees comprised therein. For example, the tilted angle 216 may range from about 1° to about 20°, from about 20° to about 45°, or from about 45° to about 90° below the horizontal axis 293, including any degree or range of degrees comprised therein. Referring to FIGS. 4C and 5C, if the fuel cell stack 12 is the tilted in position 216, the separate valve system 242 or the multi-phase valve system 232 may be able to drain liquid water 203. Tilted position 216 may include any position in which the separate valve system 242 or the multi-phase valve system 232 is located at a lower elevation than the fuel cell stack 12.

The fuel cell or powertrain system 101 may comprise of the separate valve system embodiments 220, 242, 244 at the wet end 294 and/or at the dry end 292. Alternatively, the fuel cell or powertrain system 101 may comprise of the multi-phase valve system embodiments 210, 232, 234 at the wet end 294 and/or at the dry end 292. The fuel cell or powertrain system 101 may comprise of the multi-phase valve system 210, 232, 234 at the wet end 294 or at the dry end 292, and may also comprise the separate valve system 220, 242, 244 at the other end (294 or 292). The water drain valve 222 in the separate valve system embodiments 220, 242, 244 used in the fuel cell or powertrain system 101 may be used as a valve for draining liquid water 203 and for purging the gas mix 204, similar to the exhaust valve 212 in the multi-phase valve system embodiments 210, 232, 234.

The multi-phase valve system embodiments 210, 232, 234 may be less complex to implement as compared to the separate valve system embodiments 220, 242, 244, but the size of the multi-phase valve system 210, 232, 234 typically need to be experimentally determined. Implementation of the separate valve system embodiments 220, 242, 244 comprising the separate water drain valve 222 and/or the gas purge valve 224 is more complex than the multi-phase valve system 210, 232, 234 comprising the one single exhaust valve 212. However, the separate valve system embodiments 220, 242, 244 comprising separate exhaust valves for water 222 and for gases 224 may be more efficient because of the segregation of liquid water 203 from the gas mix 204. The present systems and apparatus 101 to utilize different types of exhaust valve systems (e.g., multi-phase and/or separate valve systems) that accommodate the tilted orientation 214, 216 of a fuel cell stack 12 to purge liquids and gases is an improvement in the art.

A method for controlling purge and/or implementing a purge strategy may comprise of a controller 198. The controller 198 is responsible for managing or controlling the multi-phase valve system 210, 232, 234 including the multi-phase exhaust valve 212 and/or the separate valve system 220, 242, and 244 including the separate exhaust valves 222 and 224 at the wet end 294 or at the dry end 292 of the fuel cell or powertrain system 101. The methods may include an open loop, map-based control strategy to determine a purge strategy. The purge strategy is based on an open loop map-based control strategy and utilizes a regular periodic function defined by three key parameters: (1) an operating current density of the fuel cell stack 12, (2) a period of time (T) between purge events, and (3) a purge on/off duty cycle or the fraction of "on" time (e.g., purge on).

Figures 6A, 6B:
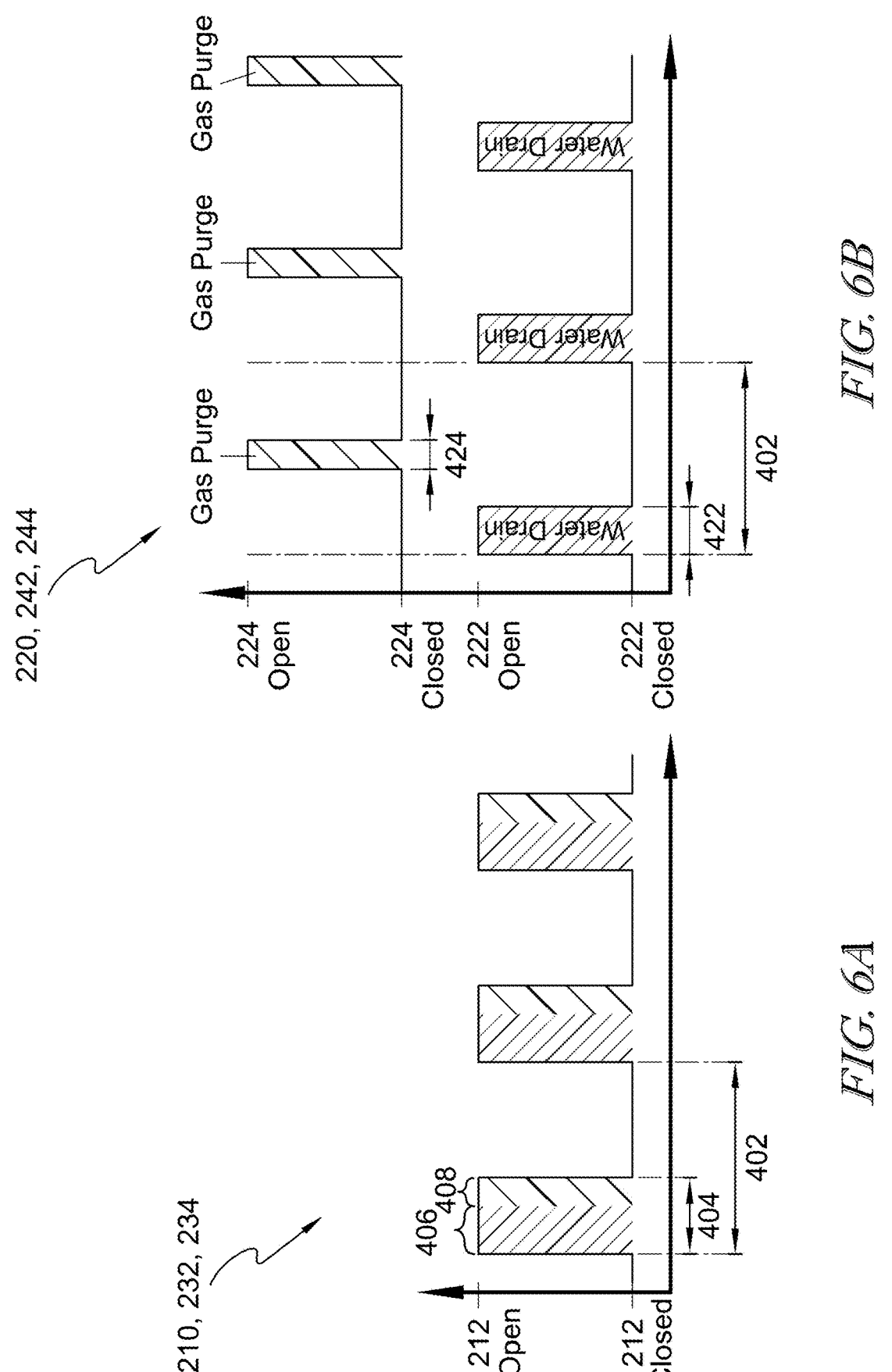
FIG. 6A is graph showing the purge on/off duty cycle calculation for a multi-phase valve system.
FIG. 6B is graph showing the purge on/off duty cycle calculation for a separate valve system.

As shown in FIGS. 6A and 6B, a purge event include draining of liquid water 203 or purging of the gas mix 204. A period of time (T) 402 between purge events may be referred to as a purging frequency (frequency=1/T). The purge on/off duty cycle of a multi-phase or separate valve system (e.g., 210, 232, 234, 220, 242, 244) is determined by when the exhaust valve(s) 212, 222, 224 are open, i.e. an "on" time 404 for the valves 212, 222, 224. The "on" time 404 of the valves 212, 222, 224 comprises a fraction of the period of time (T) 402 and may be any amount of time less than T. For example, the "on" time may range from about ½T to about 1/100T, including any specific or range of time comprised therein As shown in FIG. 6A, the on time 404 for the multi-phase valve system 210, 232, 234 comprising a single exhaust valve 212 may comprise a time for draining liquid water 406 and a time for purging gas mix 408. As shown in FIG. 6B, the "on" time 404 for the separate valve system 220, 242, 244 may comprise a time for draining liquid water 422 and a time for purging gas mix 424. The "on" time 404 ("on time") for the separate valve system embodiments 220, 242, 244 may not be continuous, as it is for the multi-phase valve system 210, 232, 234 comprising the single valve 212.
Purge on/Off Duty Cycle=on Time/Period of Time The purging frequency and/or the purge on/off duty cycle of a purge strategy may be mapped against operating conditions that are based on the fuel cell stack 12 operating current density. Other operating factors that affect open loop mapping may include fuel cell stack temperature and cathode excess air ratio or cathode stoichiometry. Referring to FIG. 2, the lookup map 194 may be calibrated and used by the controller 198 to ensure that the water accumulation rate is not detrimental to the fuel cell stack 12 performance or rate of aging of the fuel cell stack 12.

Referring to FIGS. 3, 4, and 6, a method for controlling purge or implementing a purge strategy for managing or controlling the multi-phase valve system 210, 232, 234 may include the controller 198 determining the purging frequency or the purge on/off duty cycle. The method may comprise evaluating trade-offs such as minimizing total purging, minimizing exhausted fuel fraction, and/or minimizing the number of purge valve cycles to reduce wear of the valves (e.g., 212). For example, it may be preferable to purge at the lowest purging frequency possible without adversely impacting fuel cell stack 12 performance or life in order to reduce the number of cycles the valves (e.g., 212, 222, 224) must go through. The lookup map 194 may be preferably utilized and/or calibrated such that a purge strategy may use a lower purging frequency at the same purge on/off duty cycle fraction, i.e., there may be a longer time interval between purge events or the absolute opening times of the valves (e.g., 212) may be longer during a purge event.

In one embodiment with dual multi-phase valve systems 210, 232, 234 at both ends (294, 292) of the fuel cell stack 12, a water collection scheme 196 may be implemented by the controller 198 to determine the purge on/off duty cycle. Three factors are critical to determine the water collection scheme: (1) the type of gas diffusion layer (GDL) 24, 26 and the membrane electrode assembly (MEA) 22 used in the fuel cell stack 12, (2) ensuring that the required amount of liquid water 203 that is accumulated in the anode 104 is purged by collecting the liquid water 203 in the water collection device 226 or any external basin or water separator device 227, and (3) ensuring that the liquid water 203 collection procedure is trialed at various current densities while maintaining fuel cell stack 12 performance. The water collection measurement may assist in finalizing the purge strategy implemented by the controller 198 for the purge on/off duty cycle. For example, at various current densities, a measured amount of liquid water 203 may be purged without allowing the purging of excess fuel.

Fuel cell voltages may be monitored by the controller 198, and for certain non-optimal low fuel cell voltages, the purge frequency and purge on/off duty cycle may be increased (e.g., for any fuel cell voltages that drop to about 0.3 V/cell or less). The voltage drop threshold where increases may occur depends upon which operating current density. If the fuel cell voltage drops, such as during an abnormal operating condition, the purge on/off duty cycle may be changed to elevated values, such as during a "recovery" state. More specifically, the purge on/off duty cycle may be increased by about 1.5 times, including any specific or range of increase from 1 to 1.5 times. Change in the purge on/off duty cycle may ensure that the fuel cell stack 12 performance is improving by purging the excess water that accumulated in the anode 104.

Referring to FIGS. 3, 5, and 6 a method for controlling purge or for developing and/or implementing a purge strategy may comprise the controller 198. The controller 198 is configured to manage and/or control the separate valve system 220, 242, 244, including the water drain valve 222 and the gas purge valve 224 on the wet end 294 or dry end 292 of the fuel cell or powertrain system 101. In one embodiment, the method may include managing or controlling the water collection device 226, the basin or water separator device 227, and/or the level switch or sensor 228, managing or controlling a water drain valve 222, and/or managing or controlling the gas purge valve 224.

The method for controlling purge (e.g. purge control) and/or executing a purge control strategy comprises managing or controlling the separate valve system 220, 242, 244. The method may comprise of the controller 198 monitoring the basin or water separator device 227. The method may comprise signaling attainment of the threshold level previously described to a user or to the controller 198. As liquid water 203 collects in the basin or water separator device 227, the method may include the level switch or sensor 228 indicating a 'full' water level in the basin or water separator device 227 at the water threshold level.

The method may determine or detect that the water drain valve 222 is opened to remove the liquid water 203 from the water collection device 226 or from the basin or water separator device 227 when the level switch or sensor 228 on the basin or water separator device 227 indicates a 'full' water level (e.g., a measured water level by the sensor is at or above the threshold level). The method may further include independently controlling the gas purge valve 224 since there may not be any liquid water 203 at the water drain valve 222 or the gas purge valve 224.

Referring to FIGS. 3, 5, and 6, the method for purge control or purge strategy for managing or controlling the separate valve system 220, 242, 244 may comprise of the controller 198 opening the water drain valve 222 when the level switch or sensor 228 detects a water level above the threshold for a specified on time 404 after liquid water 203 is detected. The purge on/off duty cycle of the water drain valve 222 may be determined based on water level detection by the level switch or sensor 228, stack pressure, ambient pressure, and/or size of the water drain valve 222.

The period of time 402 may be determined by the controller 198 based on the amount of liquid water 203 in the basin or water separator device 227. The on time 402 may be determined by the controller 198 based on the amount of time to remove the total amount of liquid water 203 collected in the basin or water separator device 227. The period of time 402 may be determined by the controller 198 such that the amount of liquid water 203 removed is less than the total amount of liquid water 203 collected in the basin or water separator device 227.

As shown in FIGS. 2 and 6, the period of time 402 may be based on the calibratable lookup map 194 that depends on fuel cell stack 12 operating conditions such as current density, pressure, excess air ratio or cathode stoichiometry, etc. The period of time 402 may be determined by a calculation based on fuel cell stack 12 operating pressure. The specified period of time 402 and purge on/off duty cycle may be modified by the controller 198 based on a closed loop control, which may depend on feedback from a pressure signal or pressure signature 197.

The anode gas purge pressure sensor 124 at the anode outlet 114 may detect a distinctive change or drop in pressure due to the emptying of liquid water 203 from the basin or water separator device 227. The controller 198 may use the information determined by the pressure sensor to optimize the purging process. The pressure signal or pressure signature 197 (e.g., detection of a certain pressure value or reading, such as a lower threshold pressure) may be used to mark the end of the water purge event. In other embodiments, a learning algorithm (e.g., artificial intelligence and/or machine learning) may be employed to signal to the controller to automatically adjust the specified period of purge time 402 while maintaining the fuel cell stack 12 performance.

The method for purge control or purge strategy for managing or controlling the separate valve system 220, 242, 244 may include the controller 198 opening the gas purge valve 224 by implementing an open loop control strategy similar to one discussed previously. Controlling or managing the gas purge valve 224 may comprise the controller 198 using the calibratable lookup map 194 that depends on fuel cell stack 12 operating conditions such as current density, pressure, excess air ratio, and/or cathode stoichiometry, etc. The controller 198 may control or manage the gas purge valve 224 independent of or coordinated with the control or management of the water drain valve 222.

The controller 198 may also determine the opening of the gas purge valve 224 to be at a time different from, coordinated with, or opposite to the time of the opening of the water drain valve 222. The controller 198 may use a model (e.g., computational model, experimental model, data driven model, etc.) calibrated to estimate the accumulation of a crossover gas based on fuel cell stack 12 operating conditions. The calibrated model may be employed to increase or decrease the purge on/off duty cycle. In some embodiments, fuel cell stack 12 current, fuel cell stack 12 pressure may be utilized as inputs to the calibrated model.

The wet end 294 of the fuel cell stack 12 may comprise of the separate valve system 220, 242, 244 including the gas purge valve 224 and the water drain valve 222. However, a method for purge control or implementing a purge strategy may comprise of the controller 198 managing or controlling only the water purge valve 222. The fuel cell stack 12 comprising a water collection device 226 may be associated with a basin or water separator device 227, a level switch or sensor 228, and a water drain valve 222. The method may comprise managing or controlling the water collection device 226, the water separator device 227 and/or the level switch or sensor 227, and/or managing or controlling a water drain 222, but not managing or controlling the gas purge valve 224.

The purge period of time 402 may comprises time to drain water 422 and purge gas 424. More specifically, referring to FIG. 6B, the water drain valve 222 may be controlled by the controller 198 to drain liquid water 203 from the collection device 226 and/or the basin or water separator device 227 by keeping the water drain valve 222 open for enough time to allow for draining liquid water 422 or for a first specified period of time. The water drain valve 222 may be kept open for the time for also purging gas mix 424 or for a second specified period of time to purge gas after the liquid water 203 is drained. The second period of time 424 to purge gas may be based upon the calibratable lookup map 194 that depends on fuel cell stack 12 operating conditions, such as current density, pressure, excess air ratio or cathode stoichiometry, etc. In some embodiments, the second specified period of time 424 to purge gas may be based upon an open-loop strategy.

The gas purge valve 224 may be opened by the controller 198 based on open loop map-based strategy. In some embodiments, the second period of time 424 to purge gas by opening the gas purge valve 224 may be determined by a calculation based on fuel cell stack 12 operating pressure and/or temperature. Alternatively, a learning algorithm based on frequency and duration of water drain valve 222 and/or the gas purge valve 224 opening may be used by the controller 198 to modify or adjust the calibratable lookup maps 194.

A method for purge control or purge strategy may comprise of the controller 198 managing or controlling the multi-phase valve system 210, 232, 234 including the exhaust valve 212 on the dry end 292 of the fuel cell or powertrain system 101. The fuel cell stack 12 may include a water collection device 226. The fuel cell stack 12 may include a separate valve system 220, 242, 244 on the wet end 294. The method may include managing or controlling the exhaust valve 212 and/or detecting a tilt angle of the fuel cell stack 12.

Referring to FIG. 6A, the method for purge control or purge strategy may include the controller 198 managing or controlling the exhaust valve 212 when the fuel cell stack 12 is tilted in an orientation that does not allow liquid water 203 to collect in the water separator device 227 at the wet end 294. In such circumstances, the exhaust valve 212 may be opened to remove liquid water 203 and/or gas mix 204 at the dry end 292 of the fuel cell stack. If the fuel cell stack 12 is tilted in an orientation that allows liquid water 203 to collect in the collection device 226, the exhaust valve 212 may be kept open by the controller 198 for the period of time 406 to drain liquid water 203. The controller 198 can also keep the exhaust valve 212 open for the second specified period of time 408 to purge gas as described previously for the water drain valve 222 in the separate valve system 220, 242, 244.

The multi-phase valve system 210 including the exhaust valve 212 on the dry end 292 of the fuel cell or powertrain system 101 may be used in conjunction with the separate valve system 220 on the wet end 294 of the fuel cell or powertrain system 101. Referring to FIG. 6B, a learning algorithm based on frequency and duration of valve opening may be employed to adjust the specified period of time 422 to drain liquid water 203 and/or to adjust the second specified period of time 424 to purge gas. The learning algorithm based on frequency and duration of valve opening may be employed to adjust the specified period of time 402.

Figure 7:
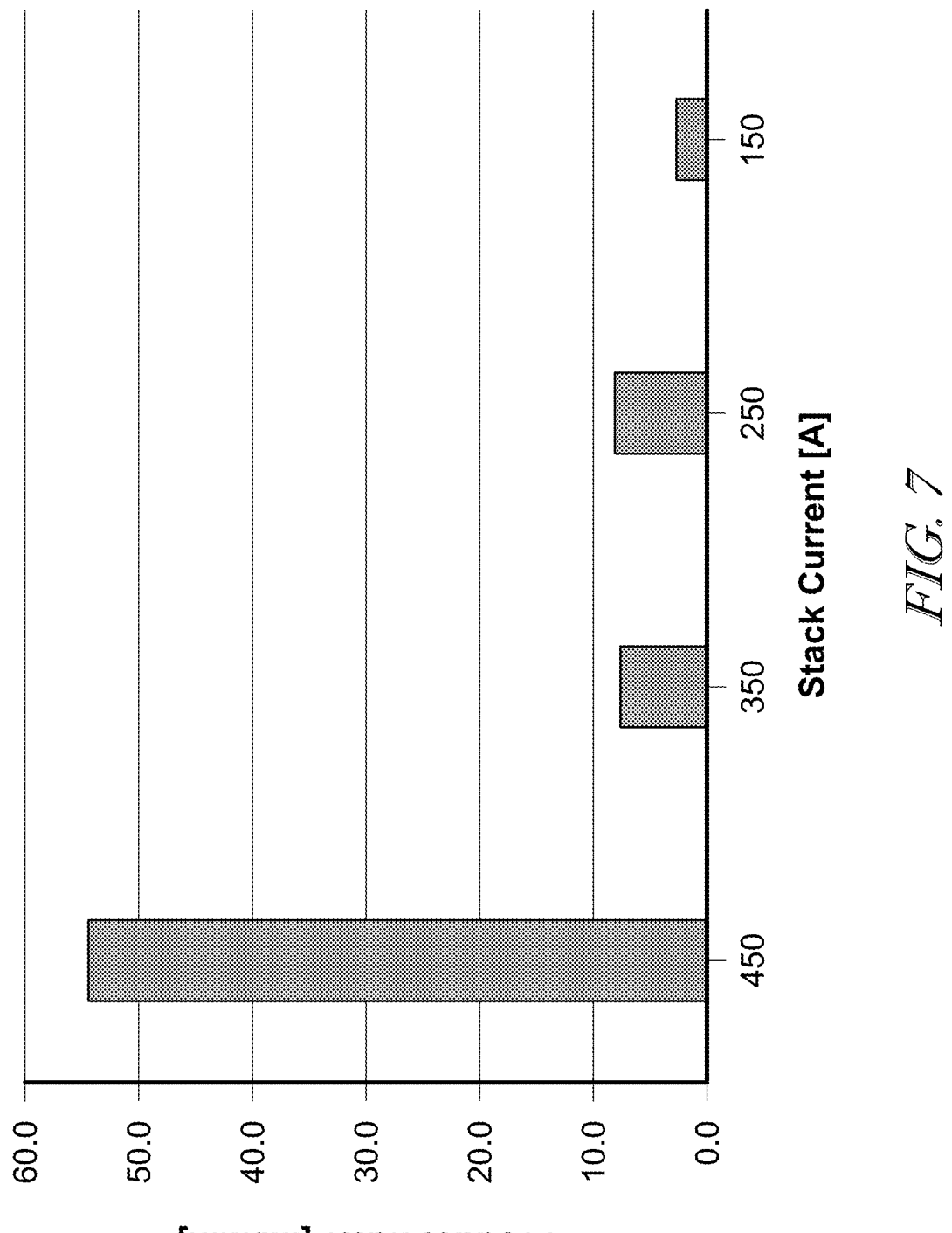
FIG. 7 is a graph showing different amount of liquid water collected at different current densities.

The calibratable lookup map 194 used in the methods above may be a purge map 195, and the factors used to develop the purge map 195 may comprise an assessment of liquid water 203 collected from the anode purge and/or the performance of fuel cell stack 12. The purge map 195 may be developed by collecting the liquid water 203 at various current or current densities ensuring the excess amount of liquid water 203 has exited the system. FIG. 7 is graph showing the different amounts of liquid water 203 collected at different current densities.

Specifically, FIG. 7 shows different amounts of water collected at the anode outlet 114 when the fuel cell stack 12 is operating at stack currents ranging from about 150 to about 450 Amps including any specific or range of Amps comprised therein, such as about 450 Amps, about 350 Amps, about 150 Amps, and about 150 Amps. As shown, the amount of water collected more than doubles when the stack current changes from 350 Amps to about 450 Amps. Such information may be included in the purge maps 195 used by the controller 198 to operate the multi-phase valve system 210, 232, 234 or the separate valve system 220, 242, 244.

There may be dual valve systems on both the wet 294 and dry 292 ends of the fuel cell stacks 12 shown in FIG. 3. The valve system on each side may be the multi-phase valve system 210, 232, 234 (see FIG. 4) or the separate valve systems 220, 242, 244 (see FIG. 5). Thus, liquid water 203 may be collected from the exhaust valve 212 or from water drain valve 222 at either wet end 294 or at dry end 292. The volume of liquid water 203 collected at both ends 292, 294 may be combined while determining the purge on/off duty cycle.

Referring to FIG. 3, inputs to the purge map 195 may include current density, cathode stoichiometry, maximum or minimum cell voltage differential via CVM, differential pressure across anode exhaust and anode inlet, and/or 3D purge mapping at various ambient conditions (such as temperature, altitude, etc.). The purge map 195 may be used to control the purge on/off duty cycle of the valves at both ends 292, 294. The purge on/off duty cycle of the purge valves may ensure that the liquid water 203 has exited the fuel cell stack 12. Alternatively, the on/off duty times may be modified based on the purge map 195. For example, at higher current densities where there is maximum water generation, the off time of the purge on/off duty cycle may be significantly smaller as compared to the off time at lower current densities.

The performance of the fuel cell stack 12 may be analyzed while developing the purge map 195 via a cell voltage monitoring (CVM) circuit board, which reads cell voltages across the fuel cell stack 12. This attribute may play a significant role while developing the purge on/off duty cycle for assessing the purge valves 222, 224. The purge on/off duty cycle may be developed to ensure that a required volume of liquid water 203 from the fuel cell stack 12 has been released. The purge on/off duty cycle may be tuned while analyzing cell to cell voltage deviations. For example, if certain cell voltages drop, such as during an abnormal operating condition, purge on/off duty cycle may be increased during a "recovery" state. This may ensure that the stack 12 performance is improved by purging the excess water 203 that may have accumulated in the anode 104.

The interaction of purging liquid water 203 and/or gas mix 204 with an ejector 130 performance may be evaluated by the controller 198 (see FIG. 2). A sudden reduction in pressure drop of the anode gas in a recirculation loop 126 may change the ejector 130 state to below a breakdown pressure. The breakdown pressure is the pressure under which the operation of the fuel cell system 101 may induce anode recirculation flow reversal. If, such a change in pressure is detected, the water drain valve 222 may be closed before the water collection device 226 or the basin or water separator device 227 is fully drained. Any remaining liquid water 203 may be allowed to buffer against a water trap. Alternatively or additionally, the anode outlet pressure sensor 124 may be used to monitor the anode gas outlet pressure as a feedback signal.

The location of the gas purge valve 224 in the system 101 is critical to the functioning of the ejector 130. The gas purge valve 224 may be located on the anode gas inlet stream 122. This may be sub-optimal because excess hydrogen 32 may be vented during the purging and could induce anode recirculation flow reversal. Alternatively, the gas purge valve 224 may be located on the anode gas outlet stream 202 of fuel cell stack 12 such that there is sufficient volume to minimize the pressure pulsation seen at the ejector 130.

Referring to FIG. 2, the controller 198 may determine the frequency and/or purge on/off duty cycle so that the total mass released during any purge event or process has a small impact on the fuel cell stack pressure. Determining that the impact of fuel cell stack pressure is minimal and may increase number of cycles on a valve and/or reduce valve life time.

The size of the gas purge valve orifice may be small enough so that the gas purge flow rate is small compared to the anode gas flow rate. Determining that the purge flow rate is small compared to the anode gas flow rate may increase the purge on times 404 and/or increase purge on/off duty cycles.

The size and/or design of the ejector 130 may be based on the purge strategy. In some embodiments, the ejector 130 nozzle may be oversized to protect for instantaneous purge flow. For example, the nozzle may be sized for 10% instantaneous purge. Alternatively, the ejector 130 nozzle may be oversized to protect for average purge flow. The ejector 130 may use pressure control to adjust the average purge flow determination to offset purge requirement. For example, the controller 198 may predict and build up pressure in the ejector 130 to compensate for purge flow.

A proportional purge valve (not shown) may be used in the fuel cell stack 12. A method of controlling or managing proportional purge valves may also include estimating the composition of the purge gas at the anode outlet 114, estimating the purge mass flow rate needed to remove the condensed liquid water 203 and any accumulated gases in the gas mix 204.

The accumulated gases in the gas mix 204 may be estimated by a gas cross over model based on operating conditions of the fuel cell stack 12 including the differential pressure between the anode 104 and the cathode 108, the operating current, the operating temperature, and/or an estimated relative humidity of the fuel cell membrane. The accumulated condensed liquid water 203 may be estimated based on the diffusivity of the GDL 24, 26 and the 'wicking' capability of the GDL 24, 26 shown in FIG. 2. Alternatively, the accumulated condensed liquid water 203 may be estimated based on operating conditions of the fuel cell stack 12 including the differential pressure between the anode 104 and the cathode 108, the operating current, the operating temperature, and/or an estimated relative humidity of the fuel cell membrane.

The initiation of a purge event may occur at regular or variable time intervals or the initiation may depend on an input signal such as the level switch, or low stack voltage. It may be a trigger event. At the beginning of a purge event, the valve may be opened fully to vent out the condensed liquid water 203. Alternatively, before the condensed liquid water 203 is fully vented, the effective flow of the valve may be slowly reduced in preparation for the circumstance when the condensed liquid water 203 is fully vented. A proportional exhaust valve may allow for more control of the purge gas flow rate compared to a non-proportional purge valve because if the effective flow are of the valve was not reduced until all the condensed liquid water 203 was removed, more gas mix 204 may be vented than required. In some other embodiments, the purge process may be continued until the required amount of accumulated gas mix 204 is vented.

The following described aspects of the present invention are contemplated and non-limiting:

A first aspect of the present invention relates to a fuel cell system. The fuel cell system comprises a fuel cell stack system comprising an endplate, an exhaust valve system configured to be connected to the endplate of the fuel cell stack for removing water and gas from an anode exhaust, and a controller configured to be connected to the exhaust valve system for regulating operation of the exhaust valve system. The exhaust valve system comprises a multi-phase valve system or a separate valve system. Operation of the exhaust valve system by the controller comprises opening the multi-phase valve system or the separate valve system to remove water before removing gas from the anode exhaust.

A second aspect of the present invention relates to a method of operating a fuel cell system. The method comprises removing water and gas from an anode exhaust using an exhaust valve system, monitoring performance of a fuel cell stack comprising an anode inlet, an anode outlet, a cathode inlet, and a cathode outlet, and controlling the exhaust valve system using a controller based on operating conditions of the fuel cell stack including one or more lookup maps.

In the first aspect of the present invention, the exhaust valve system may be the separate valve system comprising at least a first valve and a second valve. In the first aspect of the present invention, the first valve may comprise a drain valve for removing water and the second valve comprises a gas valve for removing gas. The drain valve may comprise a water level sensor or a water separator device.

In the first aspect of the present invention, the controller may control or may manage the exhaust valve system based on fuel cell stack operating conditions, time of operation, feedback loops, fuel cell stack pressure, one or more lookup maps, or one or more models. In the first aspect of the present invention, the fuel cell system may further comprise an ejector and the controller may regulate the operation of the exhaust valve system based on any change in pressure is a recirculation loop through the ejector. In the first aspect of the present invention, the fuel cell system may further comprise an ejector and the controller may compensate for purge based on size of a nozzle in the ejector. In the first aspect of the present invention, the exhaust valve system may comprise a proportional valve. In the first aspect of the present invention, the exhaust valve system may comprise the multi-phase valve system for removing water and gas at a first end of the fuel cell stack, and the separate valve system at a second end of the fuel cell stack. The separate valve system may include a first valve for removing water, and a second valve for removing gas. In the first aspect of the present invention, a first end of the fuel cell system is a dry end, and a second end of the fuel cell system is a wet end or wherein the first end of the fuel cell system may be the wet end, and the second end of the fuel cell system may be the dry end.

In the second aspect of the present invention, the one or more lookup maps comprise data or information based on water collected at the anode outlet at different current densities, cathode stoichiometry, maximum cell voltage differential measured using cell voltage monitoring, minimum cell voltage differential measured using cell voltage monitoring, differential pressure across the anode outlet and the anode inlet, or 3D purge mapping at different ambient conditions. In the second aspect of the present invention, monitoring performance of the fuel cell stack may comprise the controller analyzing cell voltages across the fuel cell stack using a cell voltage monitoring circuit board. In the second aspect of the present invention, the exhaust valve system may comprise a separate valve system including a first valve for removing water and a second valve for removing gas. Both the first valve and the second valve may be at a wet end or at a dry end of the fuel cell stack.

In the second aspect of the present invention, controlling the exhaust valve system including the separate valve system may comprise: opening the first valve when a level switch detects water level above a threshold for a period of time, and opening the second valve coordinated with or opposite to the opening of the first valve. The period of time may be determined by the controller based on operating conditions of the fuel cell comprising a first lookup map. The opening of the first valve or the second valve may be based on an open loop control strategy.

In the second aspect of the present invention, the opening of the second valve may be determined by the controller based on a second model calibrated to estimate accumulation of crossover gas based on the operating conditions of the fuel cell stack. In the second aspect of the present invention, the exhaust valve system may comprise a proportional valve.

In the second aspect of the present invention, the separate valve system comprising the first valve for removing water and the second valve for removing gas may be at the wet end. Controlling the exhaust valve system may comprise the controller: opening the first valve for draining water when a level switch detects water level above a threshold for a first period of time, and keeping the first valve open for a second period of time after draining water for purging gas. The first period of time or the second period of time may be based on the operating conditions of the fuel cell stack including one or more lookup maps. The opening of the first valve may be based on an open loop control strategy. In the second aspect of the present invention, the exhaust valve system may comprise a proportional valve.

In the second aspect of the present invention, the exhaust valve system may comprise a multi-phase valve system for removing water and for removing gas at a dry end and a separate valve system for removing water and for removing gas at a wet end. Controlling the exhaust valve system may comprise the controller: opening the multi-phase valve system when the fuel cell stack is tilted in an orientation that prevents water collection at the wet end by the separate valve system, keeping the multi-phase valve system open for a first period of time for purging water, and keeping the multi-phase valve open for a second period of time after purging water for purging gas. The first period of time or the second period of time may be based on the operating conditions of the fuel cell stack, the duration of the fuel cell stack operation, feedback loops in the fuel cell stack, the fuel cell stack pressure, the one or more lookup maps, or the one or more models. In the second aspect of the present invention, the exhaust valve system may comprise a proportional valve.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A fuel cell system comprising:
a fuel cell stack comprising an endplate,
an exhaust valve system configured to be connected to the endplate of the fuel cell stack for removing water and gas from an anode exhaust,
    wherein the exhaust valve system comprises a multi-phase valve system or a separate valve system, and
a controller configured to be connected to the exhaust valve system for regulating operation of the exhaust valve system,
    wherein operation of the exhaust valve system by the controller comprises opening the multi-phase valve system or the separate valve system to remove water before removing gas from the anode exhaust,
    wherein the exhaust valve system comprises the multi-phase valve system for removing water and gas at a first end of the fuel cell stack, and the separate valve system at a second end of the fuel cell stack, wherein the separate valve system includes a first valve for removing water and a second valve for removing gas.

2. The fuel cell system of claim 1, wherein the first valve comprises a drain valve for removing water and the second valve comprises a gas valve for removing gas, and wherein the drain valve comprises a water level sensor or a water separator device.

3. The fuel cell system of claim 1, wherein the controller controls or manages the exhaust valve system based on fuel cell stack operating conditions including one or more lookup maps.

4. The fuel cell system of claim 1, further comprising an ejector and the controller regulates the operation of the exhaust valve system based on any change in pressure through the ejector.

5. The fuel cell stack system of claim 1, further comprising an ejector and the controller compensates for purge based on a size of a nozzle in the ejector.

6. The fuel cell system of claim 1, wherein the exhaust valve system comprises a proportional valve.

7. The fuel cell system of claim 1, wherein a first end of the fuel cell system is a dry end, and a second end of the fuel cell system is a wet end or wherein the first end of the fuel cell system is the wet end, and the second end of the fuel cell system is the dry end.

8. A method of operating a fuel cell system comprising:
removing water and gas from an anode exhaust using an exhaust valve system comprising a multi-phase valve system for removing water and gas at a first end of a fuel cell stack, and a separate valve system at a second end of the fuel cell stack, wherein the separate valve system includes a first valve for removing the water and a second valve for removing the gas,
monitoring performance of the fuel cell stack comprising an anode inlet, an anode outlet, a cathode inlet, and a cathode outlet, and
controlling the exhaust valve system using a controller based on operating conditions of the fuel cell stack including one or more lookup maps.

9. The method of claim 8, wherein the one or more lookup maps comprise data or information based on water collected at the anode outlet at different current densities, cathode stoich, maximum cell voltage differential measured using cell voltage monitoring, minimum cell voltage differential measured using cell voltage monitoring, differential pressure across the anode outlet and the anode inlet, or 3D purge mapping at different ambient conditions.

10. The method of claim 9, wherein monitoring performance of the fuel cell stack comprises the controller analyzing cell voltages across the fuel cell stack using a cell voltage monitoring circuit board.

11. The method of claim 9, wherein both the first valve and the second valve are at a wet end or at a dry end of the fuel cell stack.

12. The method of claim 11, wherein controlling the exhaust valve system including the separate valve system comprises:
opening the first valve when a level switch detects water level above a threshold for a period of time,
opening the second valve coordinated with or opposite to the opening of the first valve,
wherein the period of time is determined by the controller based on operating conditions of the fuel cell comprising a first lookup map, and
wherein the opening of the first valve or the second valve is based on an open loop control strategy.

13. The method of claim 12, wherein the opening of the second valve is determined by the controller based on a second model calibrated to estimate accumulation of crossover gas based on the operating conditions of the fuel cell stack.

14. The method of claim 12, wherein the exhaust valve system comprises a proportional valve.

15. The method of claim 11, wherein the separate valve system comprising the first valve for removing water and the second valve for removing gas are at the wet end and wherein controlling the exhaust valve system comprises the controller:

opening the first valve for draining water when a level switch detects water level above a threshold for a first period of time, and keeping the first valve open for a second period of time after draining water for purging gas, wherein the first period of time or the second period of time are based on the operating conditions of the fuel cell stack including one or more lookup maps, and the opening of the first valve is based on an open loop control strategy.

16. The method of claim 15, wherein the exhaust valve system comprises a proportional valve.

17. The method of claim 15, wherein the exhaust valve system comprises the multi-phase valve system for removing water and for removing gas at the dry end and the separate valve system for removing water and for removing gas at the wet end, and wherein controlling the exhaust valve system comprises the controller:

opening the multi-phase valve system when the fuel cell stack is tilted in an orientation that prevents water collection at the wet end by the separate valve system, keeping the multi-phase valve system open for a first period of time for purging water, and keeping the multi-phase valve open for a second period of time after purging water for purging gas, wherein the first period of time or the second period of time are based on the operating conditions of the fuel cell stack, the duration of the fuel cell stack operation, feedback loops in the fuel cell stack, the fuel cell stack pressure, the one or more lookup maps, or the one or more models.

18. The method of claim 17, wherein the exhaust valve system comprises a proportional valve.

\* \* \* \* \*